Oct. 23, 1928.

G. R. LUM 1,688,976

AUDIPHONE

Filed June 21, 1924   2 Sheets-Sheet 1

Inventor:
George R. Lum,
by  Attÿ

Oct. 23, 1928.　　　　　　　　　　　　　　　　　　1,688,976
G. R. LUM
AUDIPHONE
Filed June 21, 1924　　2 Sheets-Sheet 2

Inventor:
George R. Lum,
by E. W. Adams Atty

Patented Oct. 23, 1928.

1,688,976

UNITED STATES PATENT OFFICE.

GEORGE R. LUM, OF NEW YORK, N. Y., ASSIGNOR TO WESTERN ELECTRIC COMPANY, INCORPORATED, OF NEW YORK, N. Y., A CORPORATION OF NEW YORK.

AUDIPHONE.

Application filed June 21, 1924. Serial No. 721,509.

This invention relates to audiphones or that type of apparatus known more commonly as deaf sets. More particularly, it relates to portable deaf sets using vacuum tube amplifiers.

An object of the invention is to produce an audiphone set which is small and light so as to be convenient to carry around and which shall be cheap to manufacture and efficient in use.

An important feature of the invention resides in the compact arrangement of the apparatus which materially contributes to its usefulness for the purpose intended. In accordance with this feature the filament batteries are mounted on a panel and spaced apart to permit of mounting the vacuum tubes between them. This construction provides a very compact arrangement, besides making these batteries, which must frequently be replaced, as accessible as the tubes themselves. This arrangement also permits the use of short leads from these batteries to the tube terminals as distinguished from the usual arrangement wherein the filament batteries are located in a separate compartment of the portable case.

Another and related feature has to do with the accessibility of all apparatus which must be frequently replaced. In accordance with this feature, the apparatus is so arranged in a hinged casing that when the case is opened, the tubes, filament batteries and plate batteries are exposed and accessible, while the transformers, condenser, rheostats, jacks and transmitter which are permanent installations, are concealed. More specifically, this latter equipment is mounted on the opposite side of the panel from that which carries the filament batteries and tubes and is therefore concealed by the upper half of the portable hinged casing and is practically inaccessible. This arrangement prevents the unskilled user from tampering with this part of the apparatus.

These and other features will more clearly appear from the detailed description.

Referring to the drawings

Figure 1:
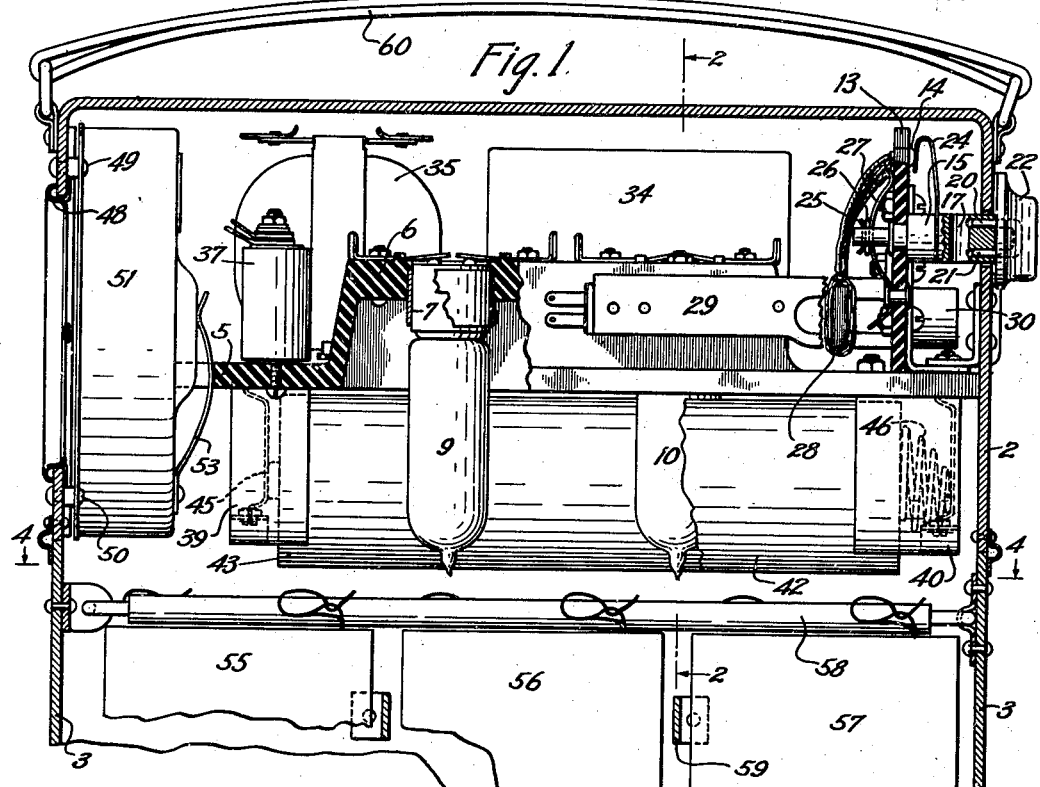
Fig. 1 is a side elevation of the set partially in section.
Figure 4:
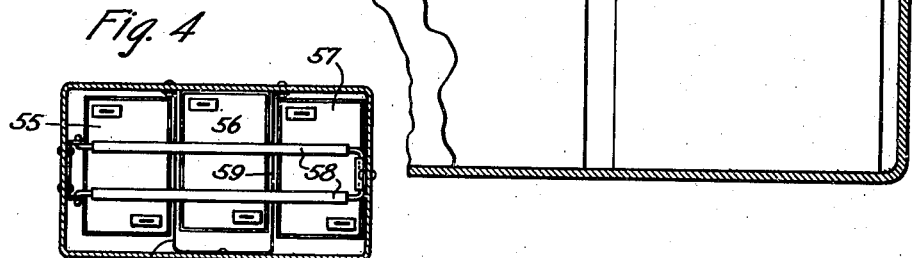
Fig. 4 is a section on line 4—4 of Fig. 1 showing the manner of holding the B batteries in place.
Figure 3:
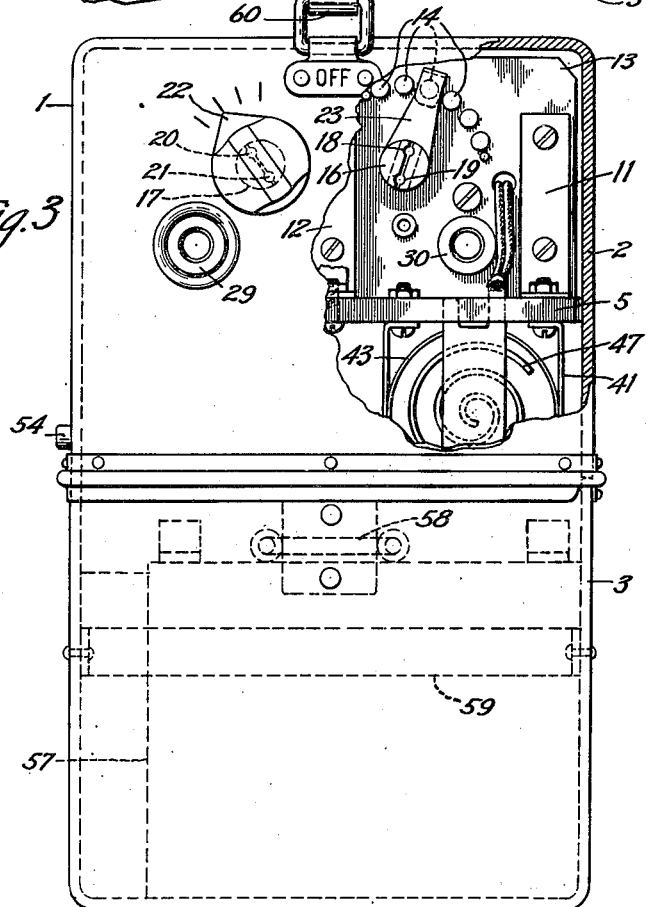
Fig. 3 is an end elevation of the set with part of the end wall or casing of the set removed.

Supported in a phenolized material case 1, of two parts 2 and 3, hinged at 4, is a molded phenolized material panel 5 having a rectangular raised central portion 6. This portion of the panel is drilled to receive two four-contact sockets 7 and 8 into which three element vacuum tubes 9 and 10 are adapted to fit. At the right hand end of the panel and at right angles thereto is mounted by brackets 11 and 12 a control panel 13 also of phenolized material. On panel 13 are mounted two series of contact studs 14, arcuately distributed about holes through which shouldered metal bushings 15 extend. The right hand series only is visible in Fig. 3, the left hand series being concealed by the cover. Through these bushings extend headed shafts 16 and 17, having their headed ends split and provided with openings 18, 19 to receive prongs 20, 21 of knobs 22. Contact arms 23, 24 fixed to shafts 16, 17 connect electrically the shafts and the studs upon which the arms rest. The shafts 16, 17 are held in position with the headed portions and contact arms against the outer ends of the shouldered portions of bushings 15 by means of pins 25, washers 26 and springs 27 as shown in Fig. 1. Mounted on a separate piece of phenolized material is a coiled resistance 28. Corresponding contact studs 14 are connected by insulated wires to different points of the resistance 28. This resistance is suspended in position by the connecting wires.

Figure 5:
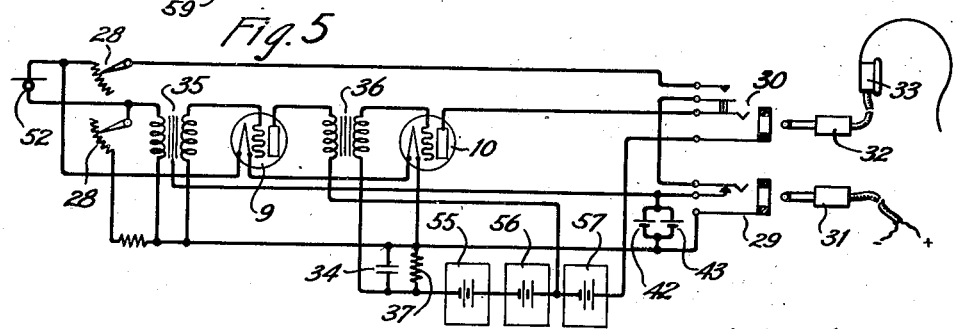
Fig. 5 is a schematic of the wiring of the set.
Figure 2:
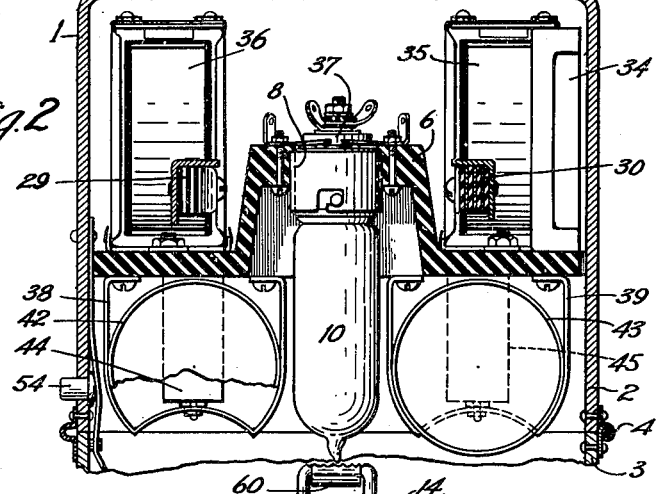
Fig. 2 is a section along line 2—2 of Fig. 1 of the upper half of the case.

On the inner face and near the end of the controlling panel 13 adjacent the main panel 5 are mounted jacks 29, 30. Jack 29 is arranged to receive plug 31 which connects to a separate filament lighting source and jack 30 is arranged to receive plug 32 which connects to a receiver 33 (Fig. 5). On one side of the main panel 5, adjacent jack 30 is mounted, by suitable brackets, a condenser 34 which may have a capacity of .3 mf. Near the end of the main panel 5, opposite the control panel (see Fig. 1) are fixed two audio frequency transformers 35 and 36, one on either side of the raised portion 6 of the panel 5. Between the transformers and at the end of the raised portion is mounted a resistance unit 37 which may be of 3,000 ohms.

On the under side of the panel 5 are mounted clamps 38, 39, 40 and 41 to hold two cylindrical flash light batteries 42, 43 for lighting the filaments of the vacuum tubes. Clamps 38 and 39 have associated with them contact plates 44 and 45 arranged to make contact with the center contacts of said batteries. Clamps 40 and 41, containing coiled springs 46 and 47 are adapted to make contact with the bases of the batteries and force them into contact with the plates 44 and 45 of the clamps 38 and 39. Vacuum tubes 9 and 10 when in place in their respective sockets 7 and 8, extend between the filament batteries 42, 43 which arrangement economizes on space in addition to protecting the tubes.

In the left end of the upper part of the case is an opening covered by a grating 48. Distributed about this opening and projecting inside the case are four studs, only two of which, 49 and 50, can be seen. A metal case 51, contains a transmitter 52 which may be of the type shown in Patent No. 1,333,744, dated March 16, 1920 to E. C. Wente and has four holes in a flange into which these studs project. Spring 53 attached to the rear of case 51 holds the transmitter casing in place, studs 49 and 50 protruding through the holes in the flanges of the transmitter case. The enclosing case 1 has a snap catch 54 on the opposite side from the hinge 4 so that the upper part which contains the apparatus just described may be swung open to render the apparatus within the case accessible. The lower part 3 of the case contains three plate potential batteries 55, 56 and 57 held in position by straps 58 and 59, which may be readily removed and replaced when the case is opened. A leather handle 60 is fastened to the case.

A circuit which may be used with the audiphone of this invention is shown in Fig. 5. In this figure similar reference characters designate similar parts of the other figures. When it is desired to use the set, plug 32 is placed in jack 30. This closes the filament circuits of tubes 9 and 10 and also prepares the plate circuit. Sounds taken up by the transmitter 52 are amplified by transformers 35 and 36 and tubes 9 and 10 and may be heard in the receiver 33. In case a separate filament lighting source is available plug 31 is placed in jack 29 which disconnects batteries 42 and 43 and substitutes the other source of current to save the batteries.

What is claimed is:

1. In an audiphone, in combination, a panel, vacuum tubes mounted on said panel, dry cells mounted on the sides of said panel adjacent said tubes, a second panel mounted on the opposite side of said panel, a pair of jacks mounted on said second panel, one of said jacks being connected to the output of said tubes, and the other so connected into the filament circuit of said tubes that an outside source of current may be substituted for said cells.

2. In an audiphone, in combination, a hinged two part portable case, a panel having a depressed portion mounted in the upper part of the case, vacuum tubes mounted in said depressed portion, dry cells therefor detachably mounted on the lower side of said panel one on each side of said tubes, permanently wired equipment mounted on the upper side of said panel, plate batteries detachably mounted in the lower half of the case, whereby when the case is open the vacuum tubes, filament cells and plate batteries are exposed while the other equipement is concealed behind the panel.

3. In an audiphone, in combination, a hinged two-part portable case, a panel mounted in the upper part of the case, vacuum tubes and dry cells therefor detachably mounted on the lower side of said panel, permanently wired equipment mounted on the upper side thereof, plate batteries detachably mounted in the lower half of the case, whereby when the case is opened the vacuum tubes, filament cells and plate batteries are exposed while the other equipment is concealed behind the panel.

In witness whereof, I hereunto subscribe my name this 19th day of June, A. D. 1924.

GEORGE R. LUM.